May 14, 1957

C. U. VAUGHN 2,792,034

ENDLESS CHAIN LOG TURNER

Filed Sept. 10, 1954

INVENTOR.
CARVIS U. VAUGHN
BY
Patrick D. Beaver
ATTORNEY

May 14, 1957
C. U. VAUGHN
2,792,034
ENDLESS CHAIN LOG TURNER
Filed Sept. 10, 1954
3 Sheets-Sheet 2
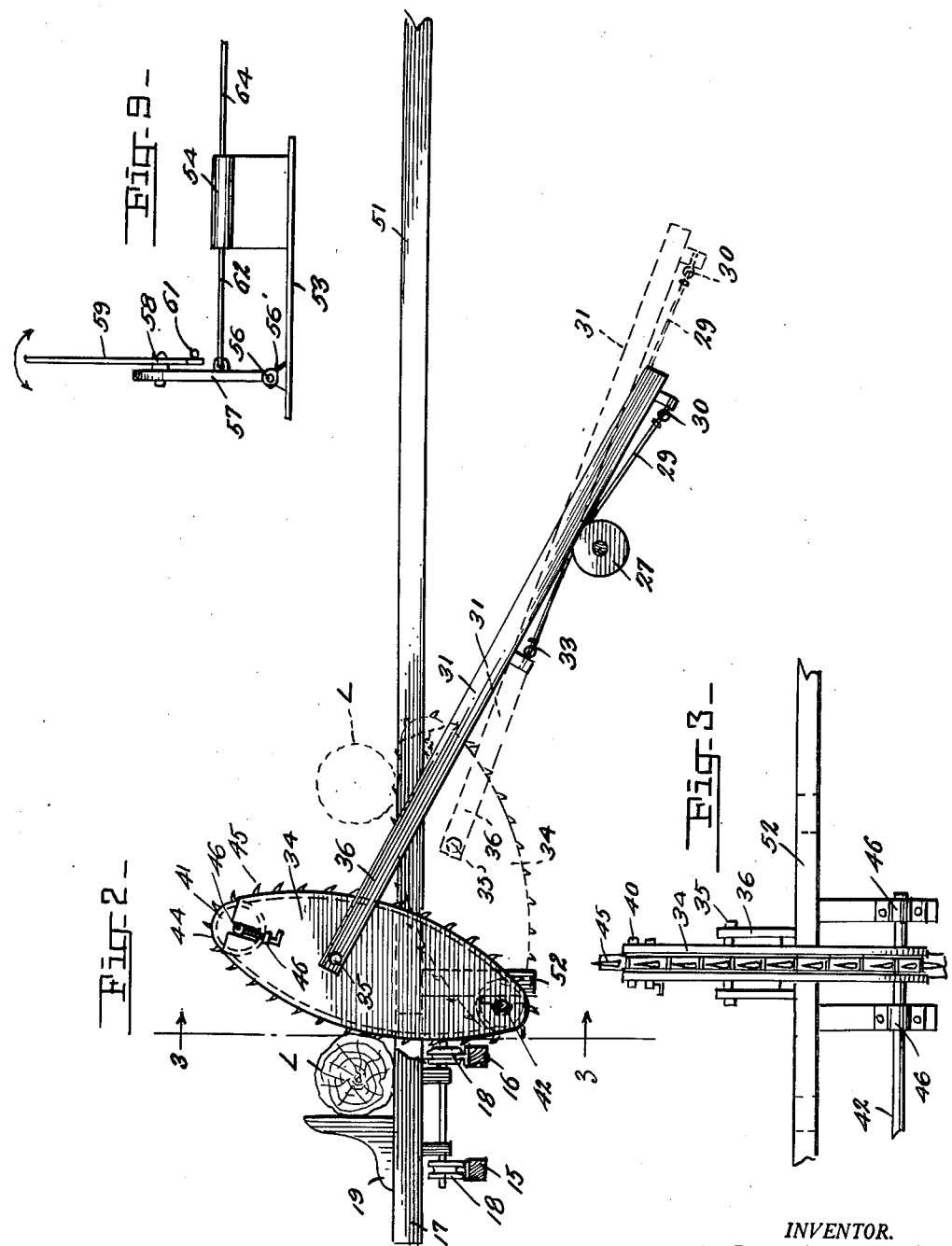
INVENTOR.
CARVIS U. VAUGHN
BY
*Patrick D. Beaver*
ATTORNEY May 14, 1957 C. U. VAUGHN 2,792,034
ENDLESS CHAIN LOG TURNER
Filed Sept. 10, 1954 3 Sheets-Sheet 3
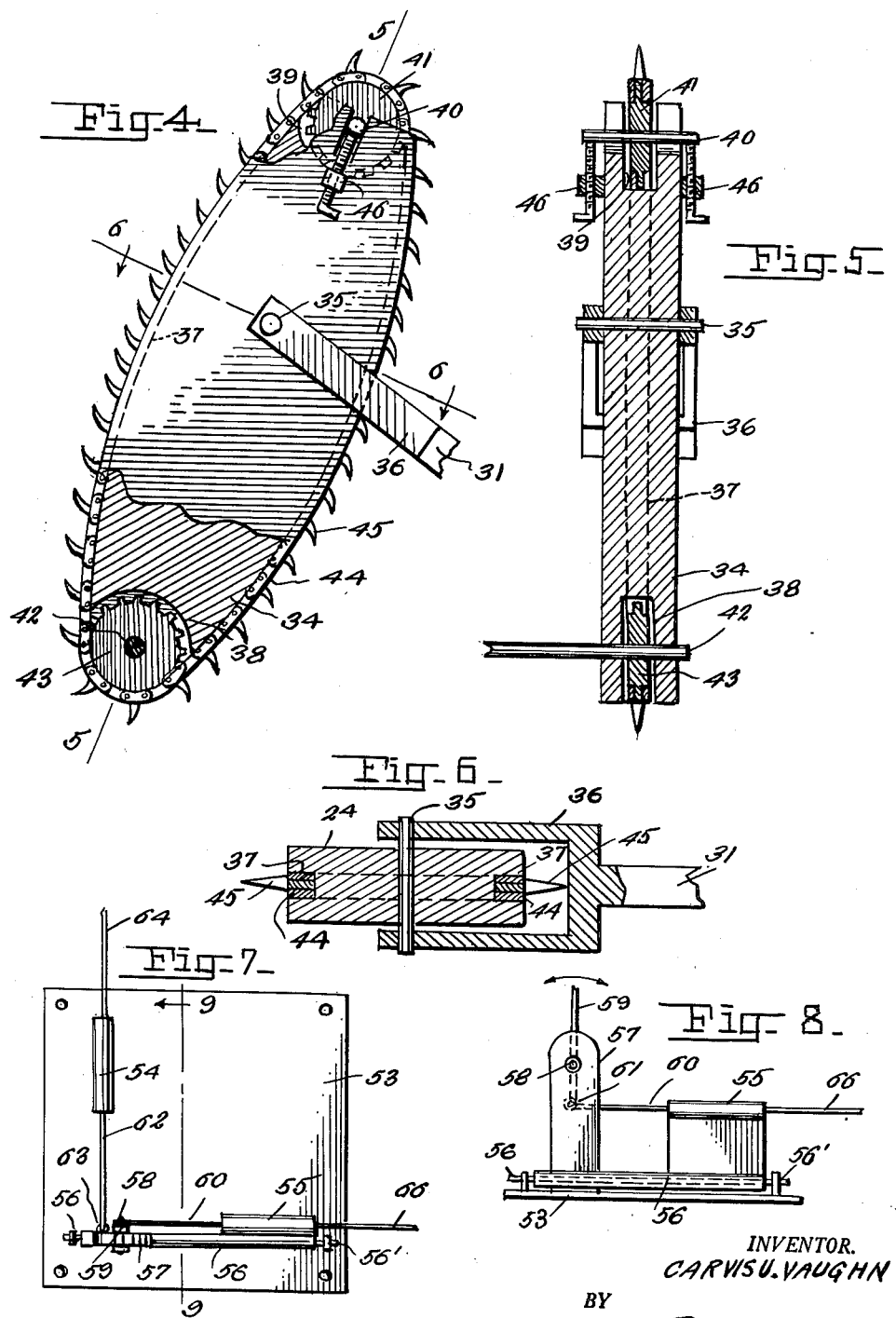
INVENTOR.
CARVIS U. VAUGHN
BY
Patrick D. Beavers
ATTORNEY

United States Patent Office 2,792,034
Patented May 14, 1957

2,792,034

ENDLESS CHAIN LOG TURNER

Carvis U. Vaughn, Glenwood, Ark.

Application September 10, 1954, Serial No. 455,101

1 Claim. (Cl. 143—102)

This invention relates to saw mills, and more particularly to an improvement in the log handling mechanism of the saw mill.

An important object of the invention is to provide a mechanism which will replace the conventional nigger head that is ordinarily employed for turning logs upon the carriage of the saw mill.

Another object of the invention is to provide a log handling mechanism that will not damage the logs to the same extent that they are damaged by the conventional nigger head.

A further object of the invention is to provide a log handling mechanism which is efficient in operation and simple in construction.

The log handling mechanism embodying the present invention will shift the log to the carriage from the skidway and under normal conditions the log handling mechanism is hidden between the skids of the skidway.

With the above and other objects and advantages in view the invention consists of the minor details of construction, arrangement and combination of parts more fully hereinafter described, claimed and illustrated in the accompanying drawings in which:

Fig. 1 is a fragmentary plan view of a saw mill having the log handling mechanism embodying the invention incorporated therein;

Fig. 2 is a fragmentary sectional view on the line 2—2 of Fig. 1, showing a side elevational view of the log handling mechanism and the manner of engagement of the same with a log to be handled;

Fig. 3 is a sectional view on the line 3—3 of Fig. 2;

Fig. 4 is a side elevational view, partly broken away and partly in section, of the log turner.

Fig. 5 is a longitudinal sectional view on the line 5—5 of Fig. 4;

Fig. 6 is a transverse sectional view on the line 6—6 of Fig. 4;

Fig. 7 is a top plan view of the controls of the log handling mechanism;

Fig. 8 is a side elevational view thereof; and

Fig. 9 (Sheet 2) is a sectional view on the line 9—9 of Fig. 7.

Referring more in detail to the drawings, wherein like parts are designated by like reference numerals, the reference numeral 10 represents a driven shaft on which is mounted a saw 11. The shaft 10 is mounted in conventional journal means 12 which are mounted in a conventional manner in a saw mill. The shaft 12 is provided with a large pulley 13 which has a belt drive, not shown, with the power source of the mill. A smaller pulley 14 is also mounted to the shaft 10 for a purpose to be later described.

Extending at right angles to the axis of the shaft 10 are a pair of rails 15 and 16 on which a log carriage 17 is mounted for movement by means of wheels 18, which engage the rails 15 and 16, as shown in Fig. 2. A pair of carraige head blocks 19 are mounted on the carriage 17 to engage a log L, as shown in Fig. 2.

The foregoing parts of the saw mill are conventional and form on part of the invention. Therefore, such parts are merely illustrative and not restrictive as to the structure of the saw mill.

Parallel with the shaft 10 and spaced therefrom is a rectangular shaped frame 20 on which is mounted a pair of automobile rear ends 21 and 22, respectively. The rear end 21 is unaltered as to its original construction, and a drive shaft 23 connects the rear end 21 to the rear end 22. A pulley 24 mounted on the shaft 23 intermediate of a pair of bearings 25 in which the shaft 23 is journalled has a belt drive connection 26 with the pulley 14 so that power is transmitted to the pulley 24 as desired.

The ring gear of the rear end 22 is reversed so that the cable drum 27, which is mounted on one section of axle 28 of the rear end 22, will rotate to the right. A cable 29 on the drum 27 is connected at 30 to the push rod 31, and a cable 32 on the cable drum 27 is connected at 33 ot the push rod 31. The cable 29 will move the push rod 31 from the position shown in dotted lines in Fig. 2 to the position shown in full lines in Fig. 2. The cables are so arranged that one will unwind as the other winds, so that the push rod 31 is always maintained steady and the cables will not tangle.

A log turner 34, which is of elliptical formation, is pivotally mounted by means of a pin 35 in a fork 36 on the end of the push rod 31. The log turner has a peripheral groove 37 and cutouts 38 and 39, (Figure 4) respectively. A shaft 40 mounts a sprocket wheel 41 within the cutout 39. A shaft 42 mounts a sprocket wheel 43 within the cutout 38, and an endless chain 44, having relatively spaced log engaging teeth 45 thereon, is mounted in the peripheral groove 37 and engages the sprocket wheels 41 and 43, respectively. A pair of chain tighteners 46 are mounted on opposite sides of the log turner 34 and engage the shaft 40 to tighten the chain 44 as desired.

The shaft 42 is journalled in bearings 46 (Figures 1 and 3) and has a sprocket 47 on one end which is connected by a chain drive 48 to a sprocket 49 on an axle section 50 of the rear end 21.

The frame 20 is so mounted that the push rod 31 will operate between the skids 51 of the skidway 52 and the bearings 46 are mounted on the skidway 52.

The controls, Figs. 7, 8 and 9, for the log turning mechanism are mounted on a substantially square shaped base plate 53. A master cylinder 54 is mounted on the base plate 53 and a master cylinder 55 is mounted on a bar 56 so that they are at right angles to each other.

The bar 56 is pivotally mounted at 56' on the base plate 53 and a standard 57 is mounted on the bar 56 as in Fig. 8. Pivotally mounted at 58, on the standard 57, is a control lever 59.

A stem 60, of the piston in the master cylinder 55, is connected by means of a universal joint 61 to the lower end of the control lever 59. A stem 62 of the master cylinder 54 is connected by means of a universal joint 63 to the standard 57.

The master cylinders 54 and 55 are similar to the master cylinders of the conventional hydraulic brake system of an automobile. Thus, the master cylinder 54, by means of the flexible tubing 64 connected to the brake system 65 of the rear end 21, will control the movement of the rear end 21. Likewise, the master cylinder 55, by means of the flexible tubing 66 connected to the brake system 67 of the rear end 22, will control the movement of the rear end 22.

As shown in Fig. 8, the control lever 59 will move back and forth as indicated by the arrows and such movement will control the master cylinder 55. In Fig. 9, the arrows indicate that the control lever 59, standard 57 and master cylinder 55 pivot as a unit with the bar 56 on the pivots 56' and such movement will control the master cylinder 54. Thus, both master cylinders can be operated simultaneously or they can be operated separately.

In the operation of the log handling mechanism, the brake drum of the brake system 67 is rotating, but due to the floating axle construction of the rear end, the cable drum 27 is idle. By controlling the master cylinder 55 by the control lever 59, the rotation of the brake drum will be stopped and the cable drum 27 will be caused to rotate, moving the push rod 31 and causing the log turner 34 to engage the log L. Maintaining pressure on the control lever 59 and moving the standard 57 on the bar pivots 56' will cause the brake drum of the brake system 65 to stop rotating. The sprocket 49 will be caused to rotate by the axle 50 and the shaft 42 will be rotated by the chain drive 48. Rotation of the shaft 42 will cause rotation of the sprocket wheel 43 and subsequent rotation of the chain 44. The teeth 45 on the chain 44 will engage the log L and cause it to turn on the skidway 52 until it is located on the carriage 17, as in Fig. 2. The control lever 59 and standard 57 are then moved to normal position, stopping the rotation of the chain 44. The log turner is maintained in position until the log is dogged. After the log is dogged onto the carriage the control lever is moved to release the brake drum of the brake system 67. The cable drum 27 will cease to operate and the weight of the log turner 34 will cause the mechanism to move to the dotted line position in Fig. 2.

The control system is effective and if properly operated will control the log turner to move the log along the skidway onto the log carriage.

The log turner will not damage the logs and knots in the logs will pass as if the log was entirely smooth on its outer surface. The amount of turning of the log and the necessary placement of the log on the carriage is easily accomplished by the control system forming a part of the invention as previously described.

When the log turning mechanism is not in operation, it will be located below the skids of the skidway so that the logs can be rolled over the log turner until it is desired to place the logs on the carriage.

It is believed that the operation and construction of the invention will be apparent to those skilled in the art and it is to be understood that changes in the minor details of construction, arrangement and combination of parts may be resorted to provided they fall within the spirit of the invention and the scope of the appended claim.

Having thus described the invention what is claimed as new and desired to be secured by Letters Patent is:

A log turner comprising a power source, a cable drum mounted on said power source, a push rod, a pair of cables on said cable drum connected to said push rod, a body pivotally mounted on one end of said push rod, an endless chain mounted on the periphery of said body, sprocket wheels mounted in said body and engaging said chain and means for driving one of said sprocket wheels, said power source comprising a pair of rear ends of automobiles connected together, said cable drum being mounted on one of the axles of one of said rear ends, said means for driving said sprocket wheels being connected to an axle of the other of said rear ends, hydraulic brakes upon each of the other axles of said rear ends, and control means comprising a plate, a first master cylinder mounted on said plate, a standard mounted on said plate, a lever pivotally mounted on said standard, a piston stem extending from said first cylinder and universally connected to the lower end of said lever, a second master cylinder mounted on said plate and extending at right angles to said first cylinder, a piston stem extending from said second cylinder and universally connected to said standard, and flexible tubing interconnecting each of said cylinders with one of said brakes.

References Cited in the file of this patent
UNITED STATES PATENTS

| | | |
|---|---|---|
| 549,455 | Metzler | Nov. 5, 1895 |
| 698,750 | Skinner | Apr. 29, 1902 |
| 2,256,786 | Fritz | Sept. 23, 1941 |
| 2,431,580 | Orr | Nov. 25, 1947 |
| 2,488,343 | Standal | Nov. 15, 1949 |
| 2,574,974 | Johnson | Nov. 13, 1951 |